J. ULRICH.
VENT VALVE.
APPLICATION FILED APR. 30, 1919.

1,393,653.

Patented Oct. 11, 1921.
2 SHEETS—SHEET 1.

WITNESSES
H. T. Walker
J. H. Smart

INVENTOR
JOHN ULRICH
BY
ATTORNEYS

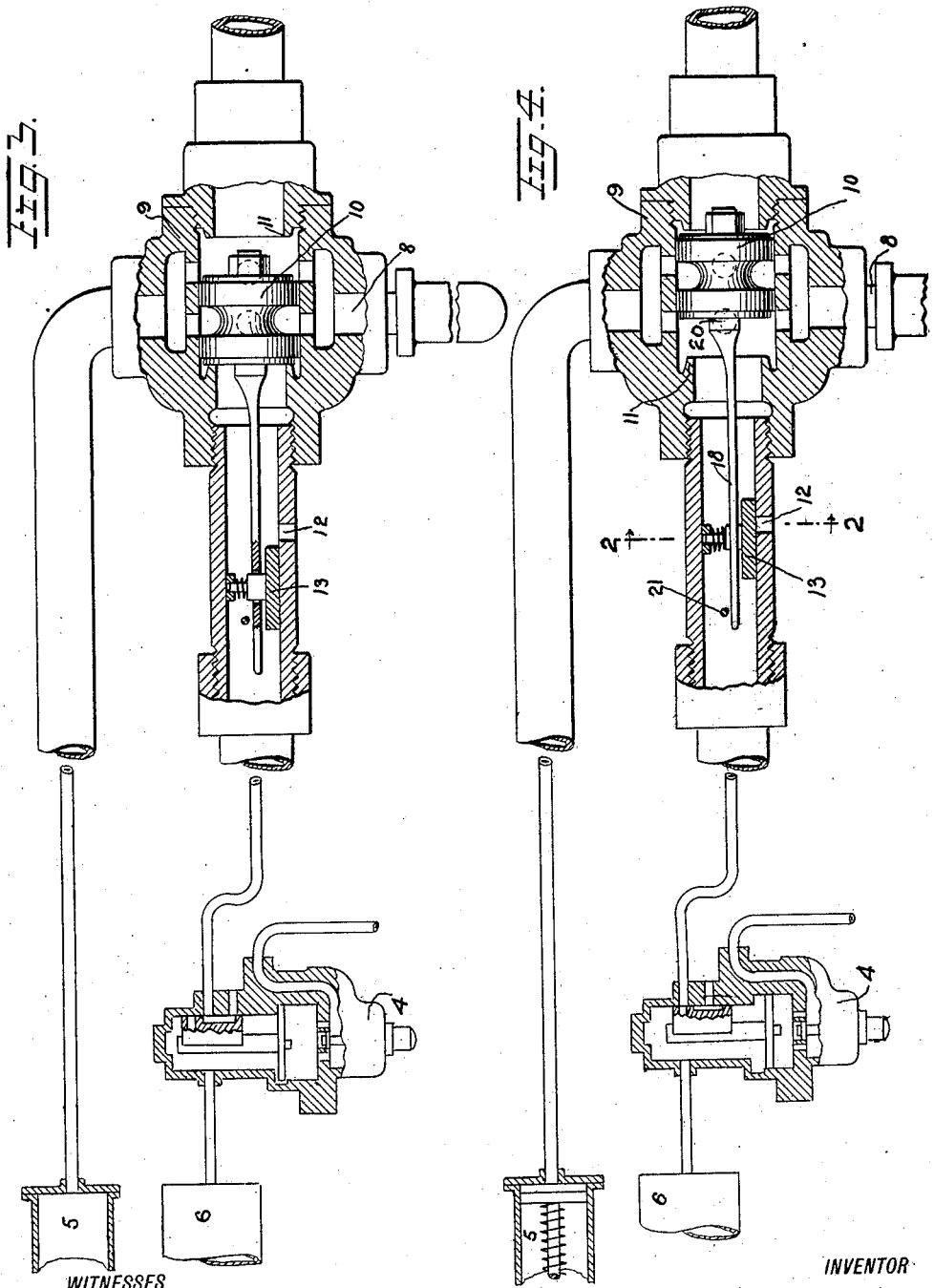

UNITED STATES PATENT OFFICE.

JOHN ULRICH, OF ST. LOUIS, MISSOURI.

VENT-VALVE.

1,393,653.  Specification of Letters Patent.  Patented Oct. 11, 1921.

Application filed April 30, 1919. Serial No. 293,644.

*To all whom it may concern:*

Be it known that I, JOHN ULRICH, a citizen of the United States, and a resident of St. Louis, in the State of Missouri, have invented a new and Improved Vent-Valve, of which the following is a full, clear, and exact description.

This invention relates to an attachment to be applied to the conventional check valve, and aims more particularly to provide a device of this nature which shall prevent back pressure from being established in a pipe, due to leakage of fluid past a valve.

It is well known among those conversant with the railway industry that almost all engines include in their air-brake system a triple-control valve, an air-brake valve, what is known as a "double check," and a safety and release valve.

As the construction of all these parts is well known by those conversant with the art, I will limit my specification to what is more particularly my invention; and in line with this it will be understood that the release valve above referred to had to be installed on account of the brakes sticking at times, necessitating their being released by hand, in that the air was permitted to escape from the brake cylinders through a hand release valve.

By experimenting I discovered that the cause of brakes becoming stuck was a leakage from the triple valve, which leakage permitted pressure to be established between the triple valve and the double-check valve.

It is to be appreciated that in conventional constructions when straight air is applied the check valve is moved against its seat. When the brakes are released by means of the straight air-brake valve, compressed fluid flows from the brake cylinder to this double check valve, thence to the brake valve and to the atmosphere. However, when the pressure becomes low in the brake cylinder, or, on the other hand, when the brakes are partly released, there is sufficient back pressure in the pipe from the triple valve to throw the check valve to the opposite side of its housing, whereby the release to the atmosphere at the straight air-brake valve is cut off, thus holding the brakes partly set until the air is permitted to escape by means of the release valve.

My invention aims to overcome this obvious and well-appreciated defect of present air-brake systems by the use of an automatic vent valve.

My invention is adapted to be associated with the system in such a manner that when the check valve is moved against its seat, the automatic vent valve is opened and permits the escape into the outer atmosphere of any back pressure which might be built up in the line and prevent the proper releasing of the brakes, without the use of the hand release valves which are now found to be necessary.

Reference is had to the accompanying drawings which form one practical embodiment of my invention, and in which—

Fig. 3 is a sectional view taken along the line 3—3 of Fig. 2 and showing the check valve closed and the vent valve open; and Fig. 4 is a view similar to Fig. 3 but showing the check valve open and the vent valve closed.

Figure 1:
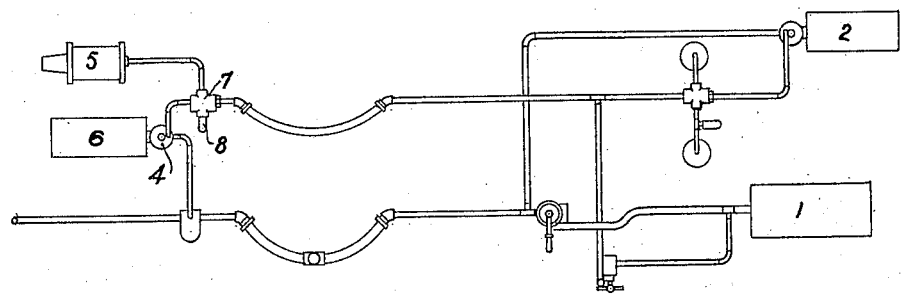
Figure 1 is a general plan of the conventional air-brake system.
Figure 2:
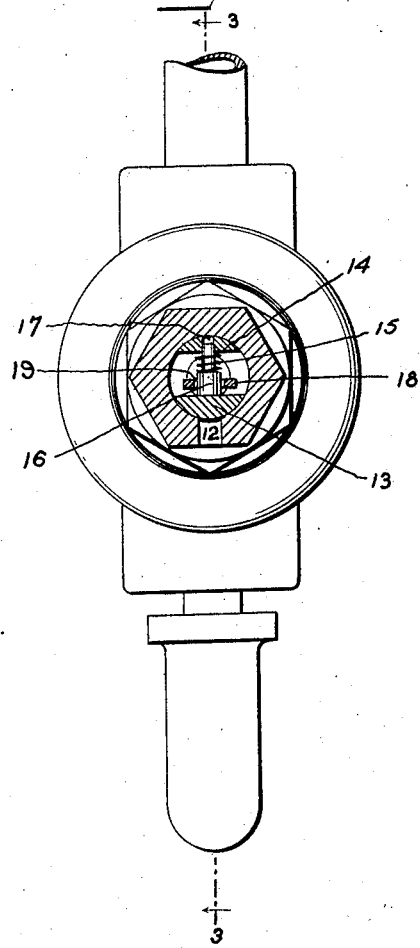
Fig. 2 is a sectional view taken along the line 2—2 of Fig. 4.

Referring more particularly to Fig. 1, it will be seen that the reference numeral 1 designates the main tank, and 2, the auxiliary tank. The triple valve 4 is connected with the combined engine and train brake system of the automatic and direct type for controlling in the usual manner the admission and expulsion of air into and from the air-brake cylinder 5, as well as the auxiliary tank 6. The check valve referred to in the preamble of this specification is designated by the reference numeral 7 and is provided with a release-valve connection 8.

Referring more particularly to the check valve, it will be seen that the same includes a conventional housing 9 formed with passages, the flow of fluid through which is controlled by means of the valve body 10 which is slidably mounted within such housing 9. It will further be understood that seats, such as 11, are formed within the housing 9, against which the ends of the valve body 10 may bear in either its left- or right-hand position.

The pipe extending between the check valve 7 and the triple valve 4, in accordance with my invention, is provided with an opening 12, the flow of fluid through which is controlled by means of a slide valve positioned within such pipe. This valve includes a body portion 13. which is caused to firmly seat within the pipe by means of a bearing plate, such as 14, engaging the upper surface of the pipe. The valve 13 and the bearing plate 14 are caused to tend to move in opposite directions by means of a spring 15 interposed between them and the slidable mounting existing between the bearing plate 14 and the valve 13, by virtue of the stud 16, which may form an integral part of the valve 13, the upper end of such stud extending into an opening 17 of the bearing plate 14.

The aforedescribed valve is now operatively connected and controlled by the check valve by means of a rod 18 which is formed with an opening 19 encircling the stud 16. The rod 18, as aforementioned, is secured to the check valve 10; and at the point of engagement of these two members there is provided a pivot 20 which will permit of a certain rocking motion of the rod 18, which should be provided for by reason of torsional strain which might be set up.

It will be understood that in the usual check valve the body 10 may rotate at will, as this does not affect the proper operation of the apparatus; but it will readily be appreciated that any such turning in connection with my improved vent valve would result in such valve 13 not seating upon and closing the opening 12 when the check valve is in open position. To overcome this objection, I provide a pin 21 extending across the bore of the pipe and adjacent the upper surface of the rod 18, by virtue of which any rotational motion on the part of the check valve 10 and the rod 18 will immediately be stopped by the said rod engaging the pin 21.

In operation, it will now be appreciated, reference being had more particularly to Figs. 3 and 4, that in the old construction any leakage which might occur past the triple valve 4 would build up pressure within the pipe extending therefrom to the check valve 10, which would result in a binding of the brakes and consequential wear upon the various parts of the carriage and, more particularly, the treads, flanges and brake shoes. In connection with my improved construction, it will be seen that when the check valve 10 is closed any compressed fluid escaping around the triple valve 4 will escape through the open vent 12, and no operation of hand valves, or any other such arrangement, will be necessary. In view of the fact that the valve body 13 slides beyond the vent 12, atmospheric pressure will exist within the pipe between the check valve 10 and the triple valve 4. And in addition to this, any improper seating of the valve 10 will be prevented, due to the fact that no pressure is acting upon its rear face. On the other hand, when the check valve 10 is open, the vent 12 is closed by means of the body 13, so that this construction does not in the least interfere with the ordinary operation of the check valve, it being appreciated that the space between the bearing plate 14 and the body 13 is ample for the flow of fluid therethrough.

In the systems with which my invention is most especially adapted to be used the safety valve 8 is in communication at all times with the brake cylinder, its function being to prevent the pressure in the brake cylinder from exceeding a predetermined point. It is to be noted, however, that as long as the pressure in the brake cylinder and communicating parts of the cylinder does not exceed the predetermined point the safety valve 8 retains the pressure in the system and does not permit the escape thereof except at such times as the pressure exceeds the limit.

When straight air is applied the check valve 10 is in the position shown in Fig. 3, the triple valve being seated with the reservoir disconnected from the brake cylinder. It sometimes happens however that notwithstanding the fact that the triple valve is seated so as to disconnect the brake valve from the cylinder, a certain amount of pressure leaks through the triple valve into the pipe connecting the triple valve and the check valve and builds up pressure in this pipe. This building up of pressure is prevented in my arrangement as it escapes through the port 12 which is open at this time and only at this time. When the brakes are to be released from the straight air application the pressure from the brake cylinder is exhausted through the straight air brake valve but if the pressure were allowed to build up between the triple valve and the check valve this exhaustion of the pressure of the brake cylinder through the air brake valve would not be allowed to be completely effected as when the pressure in the brake cylinder and the pipe line to the air brake line had been lowered below the built up line pressure the check valve 10 would be moved to the seat 11 and prevent further exhaustion at the pressure of the brake cylinder. This would result in the undesirable sticking of the brakes.

It is apparent that when the automatic system is brought into action that the triple valve is retracted as shown in Fig. 4, due to the reduction of the train line pressure and that the reservoir pressure flows to and acts in the brake cylinder, the port 12 at this time being closed by the valve 13 as the check valve 10 has been forced against the seat 11 by the reservoir pressure.

Having thus described my invention, I claim as new and desire to secure by Letters Patent:

1. In an air brake of the character described, in combination, a brake cylinder, a triple valve, a pipe connection between said triple valve and said brake cylinder, a check valve interposed in said pipe connection, said pipe connection having an opening to the atmosphere intermediate said check valve and said triple valve, and a valve controlling said opening and connected to said check valve, all as and for the purposes set forth.

2. In an air brake of the character described, in combination, a brake cylinder, a triple valve, a connection between said triple valve and said brake cylinder, a check valve interposed in said connection, said connection having an opening to the atmosphere intermediate said check valve and said triple valve, a valve controlling said opening and means connecting said valve and said check valve whereby said opening vents the leakage past said triple valve during straight air application and closes said opening to permit automatic application.

3. In an air brake of the character described, in combination, a brake cylinder, a triple valve, a pipe connection between said triple valve and said brake cylinder, a check valve and associated release valve interposed in said pipe connection, said pipe connection being open to the atmosphere intermediate said check valve and associated release valve and said triple valve, and a valve controlling said opening and connected to said check valve.

4. In an air brake of the character described, in combination, a brake cylinder, a triple valve, a pipe connection between said triple valve and brake cylinder, a check valve interposed in said pipe connection, said pipe connection having an opening to the atmosphere intermediate said check valve and said triple valve, a slide valve controlling said opening, and a connecting rod having one end secured to said sliding valve and the opposite end pivoted to said check valve whereby said slide valve uncovers said opening to permit exhaustion of the triple valve leakage during straight air application and closes said opening during automatic application.

5. In an air brake of the character described, in combination with the check valve and associated release valve, a slide valve and a connecting rod having one end secured to said slide valve and the other end pivotally secured to said check valve.

6. In an air brake of the character described, in combination, a triple valve, a check valve, a pipe connection between said triple valve and said check valve, said pipe connection having an opening, a valve controlling said opening, and means connecting said last-named valve to said check valve to uncover said opening when said valve is seated adjacent said triple valve and to cover said opening when said check valve is seated remote from said triple valve.

7. In an air brake of the character described, in combination, a triple valve, a check valve and associated safety valve, a pipe connection between said triple valve and said check valve, said pipe connection having an opening, a slide valve for said opening and a connecting rod having one end secured to said slide valve and its opposite end secured to said check valve, whereby said slide valve closes said opening when said check valve is seated remote from said triple valve and uncovers the opening when the check valve is seated adjacent the triple valve.

JOHN ULRICH.